United States Patent
Sandner et al.

(10) Patent No.: US 9,735,655 B2
(45) Date of Patent: Aug. 15, 2017

(54) ARRANGEMENT HAVING AT LEAST ONE ELECTRICAL WINDING AND ELECTRIC MACHINE WITH THIS ARRANGEMENT

(71) Applicant: Miba Sinter Austria GmbH, Laakirchen (AT)

(72) Inventors: Christian Sandner, Gmunden (AT); Dietmar Andessner, Offenhausen (AT); Ralf Kobler, Linz (AT)

(73) Assignee: Miba Sinter Austria GmbH, Laakirchen (AT)

( * ) Notice: Subject to any disclaimer, the term of this patent is extended or adjusted under 35 U.S.C. 154(b) by 475 days.

(21) Appl. No.: 14/170,707

(22) Filed: Feb. 3, 2014

(65) Prior Publication Data

US 2014/0217836 A1 Aug. 7, 2014

(30) Foreign Application Priority Data

Feb. 4, 2013 (AT) .............................. A 50087/2013

(51) Int. Cl.
*H02K 9/22* (2006.01)
*H02K 1/18* (2006.01)
(Continued)

(52) U.S. Cl.
CPC ................. *H02K 9/22* (2013.01); *H02K 1/02* (2013.01); *H02K 1/146* (2013.01); *H02K 1/182* (2013.01); *H02K 1/185* (2013.01)

(58) Field of Classification Search
CPC .......... H02K 1/02; H02K 1/146; H02K 1/182; H02K 1/185; H02K 9/22
(Continued)

(56) References Cited

U.S. PATENT DOCUMENTS 7,567,010 B1* 7/2009 Farnia .................... H02K 1/185
                                            310/216.067
7,981,359 B2* 7/2011 Masuzawa ............. H02K 1/276
                                            265/120
(Continued)

FOREIGN PATENT DOCUMENTS

DE    10 2009 021 703 A1    11/2010
DE    10 2009 021 702 A1    12/2010
(Continued)

OTHER PUBLICATIONS

Austrian Search Report dated Jan. 17, 2014 in Austrian Application No. A 50087/2013 with English translation of relevant parts.

*Primary Examiner* — Alex W Mok
(74) *Attorney, Agent, or Firm* — Collard & Roe, P.C.

(57) ABSTRACT

An arrangement has at least one electrical winding having a one-part or multi-part component produced from a soft-magnetic powder composite material, which component conducts an electromagnetic flow of the winding, at least in certain regions, and has a recess provided in the region of this flow conduction, and having a one-part or multi-part, particularly metallic connector part, which has a greater mechanical strength and/or electrical conductivity and/or thermal conductivity as compared to the component, and projects into the recess of the component. In order to achieve particular thermal, mechanical and/or electrical properties, the recess penetrates the component in the region of its flow conduction, and the connector part that projects through this recess forms a mechanical, electrical and/or thermal bridge that bridges the component.

17 Claims, 5 Drawing Sheets

(51) Int. Cl.
*H02K 1/02* (2006.01)
*H02K 1/14* (2006.01)
(58) Field of Classification Search
USPC ............ 310/44, 216.044, 216.067, 216.113, 310/216.136, 216.137
See application file for complete search history.

(56) References Cited

U.S. PATENT DOCUMENTS

| | | | |
|---|---|---|---|
| 2007/0138904 A1* | 6/2007 | Chae | H02K 1/148 310/268 |
| 2007/0252447 A1* | 11/2007 | Ionel | H02K 1/148 310/44 |
| 2010/0111729 A1* | 5/2010 | Andersen | H02K 3/50 417/423.7 |
| 2010/0289348 A1 | 11/2010 | Gruendl et al. | |
| 2013/0009508 A1* | 1/2013 | Takamatsu | H02K 1/02 310/156.35 |
| 2013/0328432 A1* | 12/2013 | Hoemann | H02K 1/2786 310/156.12 |

FOREIGN PATENT DOCUMENTS

| | | | | |
|---|---|---|---|---|
| EP | 0 874 444 A1 | 10/1998 | | |
| EP | 1 267 471 B1 | 12/2006 | | |
| EP | 2 169 812 A2 | 3/2010 | | |
| GB | WO 2009116936 A1 * | 9/2009 | ............... | B22F 3/03 |
| GB | WO 2009138725 A2 * | 11/2009 | ............... | H02K 1/08 |
| JP | S61-147744 A | 7/1986 | | |
| SE | WO 2005109603 A1 * | 11/2005 | ............... | H02K 1/02 |

* cited by examiner

ARRANGEMENT HAVING AT LEAST ONE ELECTRICAL WINDING AND ELECTRIC MACHINE WITH THIS ARRANGEMENT

CROSS REFERENCE TO RELATED APPLICATIONS

Applicant claims priority under 35 U.S.C. §119 of Austrian Application No. A 50087/2013 filed Feb. 4, 2013, the disclosure of which is incorporated by reference.

BACKGROUND OF THE INVENTION

1. Field of the Invention

The invention relates to an arrangement having at least one electrical winding, having a one-part or multi-part component produced from a soft-magnetic powder composite material. The component conducts an electromagnetic flow of the winding, at least in certain regions, and has a recess provided in the region of this flow conduction. A one-part or multi-part, particularly metallic connector part, which has a greater mechanical strength and/or electrical conductivity and/or thermal conductivity as compared to the component, projects into the recess of the component.

2. Description of the Related Art

In order to cool the coils of the yoke parts of a claw-pole machine produced from a soft-magnetic powder composite material, it is known from the prior art (DE 10 2009 021 703 A1) to insert a support disk composed of aluminum between the yoke parts. For this purpose, these yoke parts form recesses that are provided in the conduction region of its electromagnetic flow. A thermal path be a heat sink can thereby be formed. The heat sink can represent a pipe that conducts cooling fluid. In this way, it is true that cooling of the yoke parts, which conduct heat relatively poorly, can be improved, but efficient cooling in the case of high power densities cannot be made possible.

Furthermore, it is known to provide delimited recesses for cooling channels with cooling fluid, in the case of yoke parts composed of a powder composite material (EP1267471B1). In this way, improved cooling of the yoke part can be achieved. Despite this comparatively great design effort, however, it is not possible to guarantee corresponding cooling, as required when high power densities have been achieved, in this way.

SUMMARY OF THE INVENTION

It is therefore an object of the invention to modify an arrangement known from the state of the art, having components that conduct an electromagnetic flow, in terms of its design, in such a manner that even high power densities can be withstood.

These and other objects are accomplished, according to the invention, in that the recess penetrates the component in the region of its flow conduction, and that the connector part that projects through this recess forms a mechanical, electrical and/or thermal bridge that bridges the component.

Although the recess penetrates the component in the region of its flow conduction, it was not possible to determine any significant disruption of the flow conduction, and this inability is essentially attributable to the isotropic property of the component produced from soft-magnetic power composite material. Because of the resulting great degree of freedom with regard to the placement of the recess, it can also become possible, for example, to ensure increased heat dissipation or improved cooling of the arrangement, in that the connector part that projects through this recess forms a thermal bridge that bridges the component. Even a region of the arrangement partitioned off by the component can thereby be protected from undesirably high heating, so that it is particularly also possible to withstand high power densities with the improved cooling according to the invention.

This benefit particularly holds true also for a winding partitioned off by means of the component, which, attached to a tooth of the component, for example, can be comparatively difficult to access or to cool from the back of the component. Furthermore, this penetrating recess can also be utilized for a load-bearing connection possibility between the parts of the arrangement, in that the connector part that projects through this recess forms a mechanical bridge that bridges the component. The component produced from a soft-magnetic powder composite material can thereby be specifically relieved of stress and, at the same time, can be mounted on the connector part in particularly robust manner. The mechanical ability of the component to withstand stress, which is known to be reduced for soft-magnetic powder composite materials in comparison with laminated cores, therefore plays a more subordinate role, and thereby an arrangement that is able to withstand mechanical stress can be created, despite the use of composite materials. Furthermore, the connector part can also be used as an electrical bridge for supplying electricity to electrical consumers. The connector part can therefore, in contrast to the state of the art, make an improved contribution with regard to the thermal and mechanical strength of the arrangement and a simplified energy supply. In this way, the connector part distinguishes itself from known measures, which are comparatively complicated in terms of design, for cooling of components composed of a soft-magnetic material.

The invention can particularly characterize itself, as compared with the state of the art, if the connector part that projects through the recess borders on the winding, at least in certain regions. In this way, the connector part can specifically ensure direct heat dissipation from the winding to a heat sink, without thereby having to expect a reduced power density of the arrangement, which would be feared on the basis of a comparatively poor heat conductivity of the component because of the soft-magnetic powder composite material. In contrast to the state of the art, a high level of design freedom can therefore be achieved in three-dimensional flow conduction through the component itself, even at high power densities, because even in the case of complex and compact conditions of the flow-conducting component, sufficient cooling of the arrangement can be guaranteed.

Design simplicity at the connector part can occur if the connector part has a crosspiece that projects through the recess of the component.

If the connector part has a plate-shaped heat flow collector that stands against the winding, waste heat from the winding can be dissipated comparatively broadly using this collector, and thereby the winding can be cooled particularly well. Preferably, the heat flow collector stands against the bottom of the winding. By this comparatively clear reduction in heating of the winding, it can be guaranteed that while the temperature at the winding remains the same, increased operating currents or current densities can be applied to the component. This feature can therefore be used, for example, in order to increase the power of the arrangement.

Compact construction conditions in the arrangement can be achieved if the plate-shaped heat flow collector stands in a thermal connection with the crosspiece of the connector part, particularly stands against the crosspiece.

By the relatively free positioning possibility of the recess on the component, the possibility can also be opened up that the component carries the electrical winding, at least in part, at least in certain regions. According to the invention, winding parts that face the component can also be sufficiently cooled by the connector part, and no disadvantages with regard to a possibly reduced power density of the arrangement has to be expected as a result.

Saturation in the component region of the recess can be prevented, with a simple design measure, if the conduction region of the component, which is restricted in terms of its magnetic conduction, has dimensions that are modified as compared with another component having an unrestricted conduction region in this region, in such a manner that essentially the same flow densities occur in both regions of the components. Thus, it is possible, for example, to provide the cross-sectional surface area that is reduced by the recess to the side of the recess, in order to thereby not produce a bottleneck in the flow conduction. As has already been mentioned, this lateral material increase does not have a negative effect on the flow conduction, because of the isotropic structure. Such a lateral material increase can be implemented, for example, by means of shoulders on the component.

In a simple design, the component and the connector part can be connected with one another with material fit. In particular, a cast material is a good possibility for this material-fit connection, as an adhesive.

In order to be able to withstand great mechanical, electrical, and thermal demands, the connector part can consist of a solid material. Aluminum can particularly distinguish itself for this purpose. As a material that demonstrates comparatively poor magnetic conductivity, aluminum can prevent magnetic short-circuits and ensure an efficient thermal bridge for cooling the arrangement.

The arrangement according to the invention can particularly distinguish itself if it is used in electrical machines. Thus, component, winding, and connector can belong to a stator or form parts of the stator of this electrical machine, in order to allow great design freedom in the flow conduction and a compact construction, despite comparatively high power densities.

It is advantageous for assembly of the electrical machine if the connector part forms not only a thermal bridge but also a mechanical bridge that centers the component with regard to other stator parts. Specifically, the position of the component can be reproducibly established by way of joining of the connector part with the flow-conducting component, thereby following not only tight production tolerances. This centering mechanical bridge can also be used to attach the component with regard to the connector part. If radial attachment is selected for this purpose, then a radial bearing that can withstand stress can be formed between component and connector part, in a simple design measure.

Simple design conditions can result if the component, particularly a multi-part component, is inserted into the yoke-shaped connector part. Furthermore, in this way the cooling of the component can be improved, in that the connector part, as a heat sink, lies against the component over a relatively large area. The design simplicity can be improved even further in that the component forms at least one tooth for carrying winding parts.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF PREFERRED EMBODIMENTS

Figure 1:
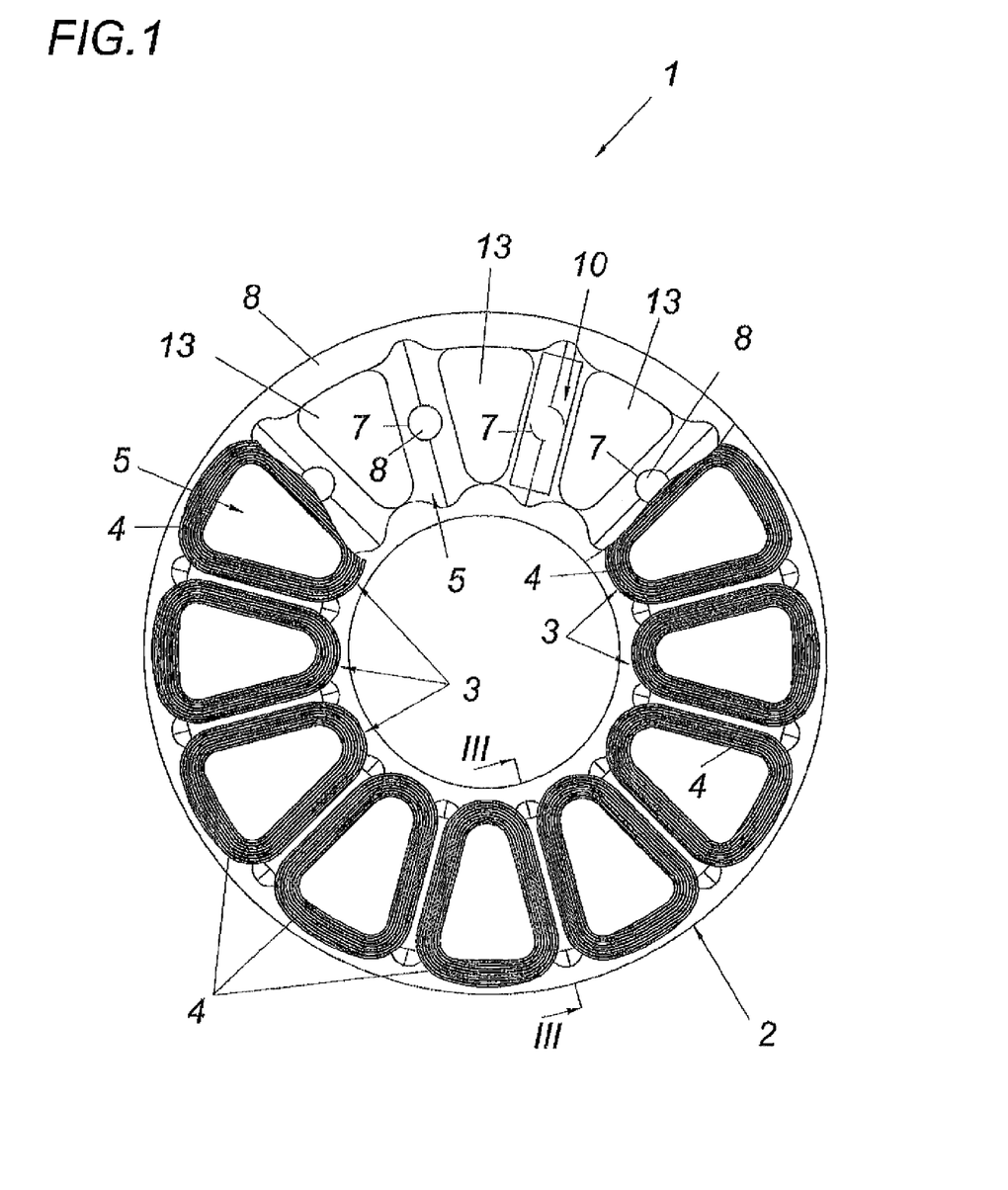
FIG. 1 is a partially elevated top view of the arrangement according to the invention, according to a first exemplary embodiment.
Figure 2:
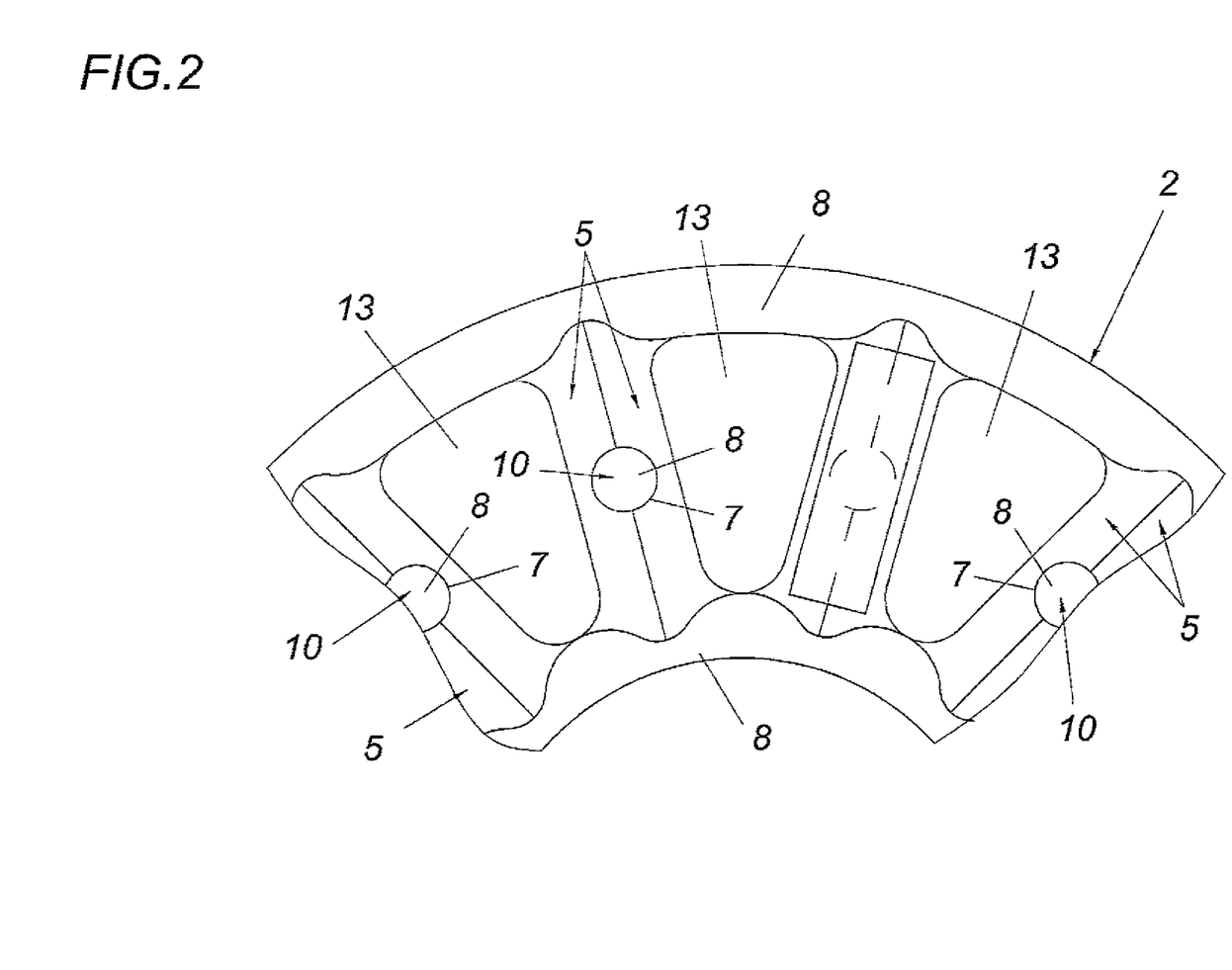
FIG. 2 is an enlarged view of FIG. 1.

According to FIGS. 1 and 2, the arrangement 1 is shown as a first exemplary embodiment of a stator 2 of an electrical machine. The arrangement 1 has a winding 3 that is structured as a tooth-coil winding with coils 4. The winding 3 applies an electromagnetic flow 6 to a multi-part component 5. See, e.g., FIG. 3. The component 5 is produced or pressed from a soft-magnetic powder composite material and possibly also heat-treated. In this way, according to the invention, a high level of design freedom in the three-dimension flow conduction can be achieved, thereby making it possible to achieve a comparatively compact construction as compared with components having laminated cores.

For cooling purposes, recesses 7 are introduced into the component 5, which—due to the compactness of the component—are also provided in the region of the flow conduction. A multi-part connector part 8 now projects into the recess 7, which part can conduct heat away from the component 5 to a heat sink, by means of its greater thermal conductivity, as compared with the component 5. In order to be able to ensure particularly effective cooling of the arrangement 1 in the case of comparatively high power densities, this recess 7 penetrates the component 5 in the region of the flow conduction of the component 5, so that a connector part 8 that projects through this recess 7 creates a thermal bridge that bridges the component 5. By way of this thermal bridge, heat can now be absorbed and also conducted away from both sides of the component 5—particularly in that the connector part 8 consists of a solid aluminum material.

The connector part 8, which projects through the recess 7, borders on the winding 3, in order to thereby cool the winding 3 particularly advantageously. Specifically, according to the invention, the heat sink on the back 9 of the stator 2 can now also be used in improved manner to compensate a temperature increase of the winding 3, because the connector part 8 thermally bridges the component 5. See FIG. 3. In this way, a relatively low heat conductivity of the component 5 therefore can no longer have such a disadvantageous effect.

Figure 3:
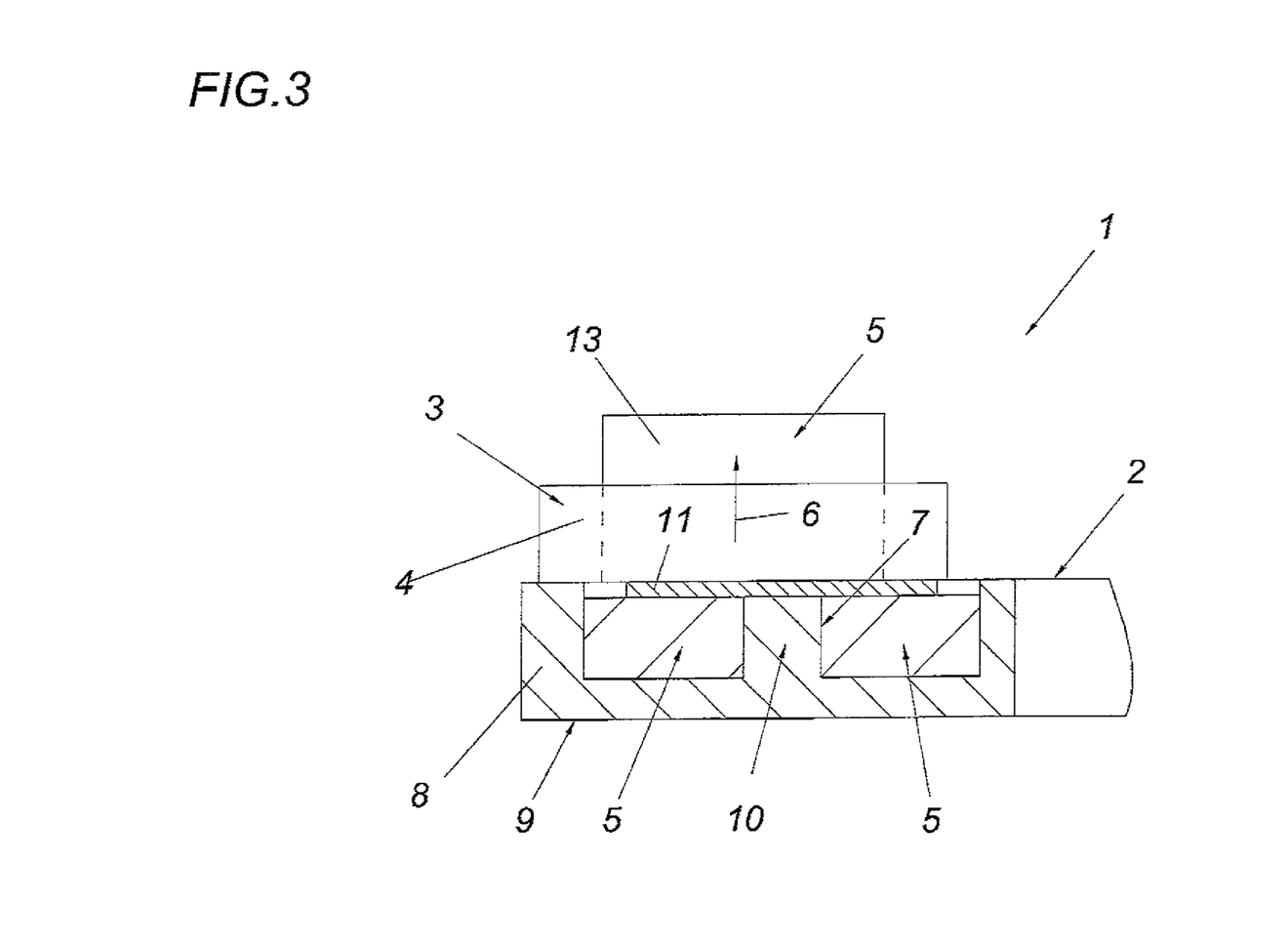
FIG. 3 is a sectional view of FIG. 1 along the line in FIG. 1.

The multi-part connector part 8 forms a crosspiece 10 that follows the recess 7 of the component 5, followed by a plate-shaped heat flow collector 11, as can be better seen in FIG. 3.

The heat flow collector 11 stands against the winding 3 and thereby stands in a thermal connection with it and with the crosspiece.

A coil 4 of the winding 3 is wound around a tooth 13 of the component 5, and thereby the component 5 accommodates and supports the winding 3. Aside from design simplicity, in this way particularly efficient application of the magnetic flow to the component 5 is also guaranteed.

In that the component 5 and the connector part 8 are connected with one another with material fit, a composite that is particularly able to withstand stress is created. Cast material is particularly suitable for this purpose—even if the multi-part component 5 is inserted into a yoke-shaped connector part 8.

Figure 4:
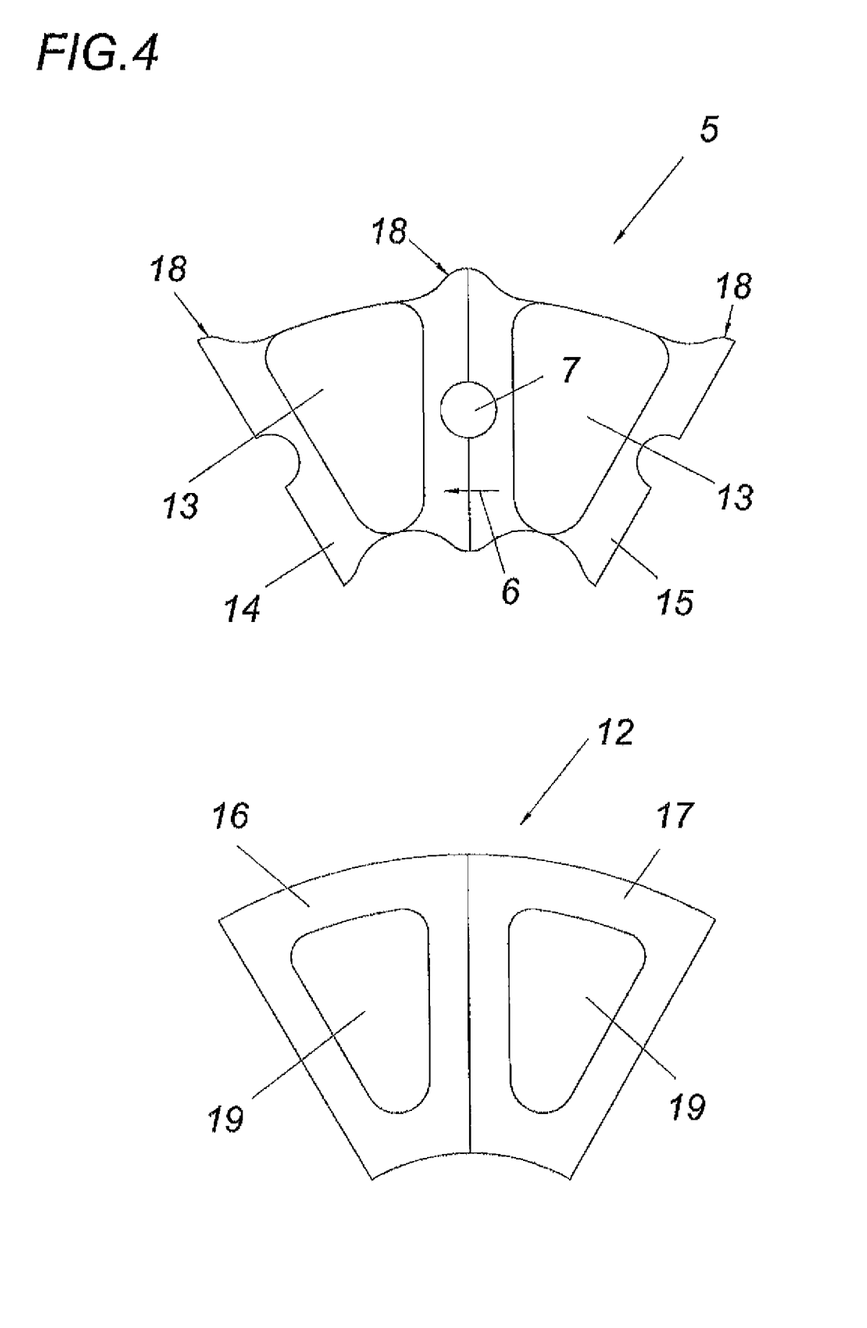
FIG. 4 is a representative comparison view of component with and without a penetrating recess.

According to FIG. 4, the difference between the component 5 of the invention and a component 12 known from the state of the art is shown in greater detail. Two component segments 14 and 15 of the multi-part component 5 according to the invention are shown, which form a recess 7 that penetrates the component 5 when they are lined up with one another. This recess 7 cannot be seen in the component 12 that is known from the state of the art and is also a multi-part component. The component segments 16 and 17 shown here, produced from a soft-magnetic powder composite material, therefore do not have a restrictive conduction region for the electromagnetic flow 6.

The position of the recess 7 in the region of the flow conduction of the electromagnetic flow 6 is comparatively non-problematic, because of the component material—possible saturation on the basis of a reduced cross-sectional area is avoided in that projections 18 are assigned to the component segments 14 and 15, at the edge. Projections 18 that are simple in design are configured to be shoulder-shaped, following the contour of the recess. In this way, it is made possible that a conduction region of the component 5 that is restricted in its magnetic conduction by the recess 7, as compared with another component 12 having an unrestricted conduction region in this region has dimensions that are modified in such a manner that despite the recess 7, essentially the same flow densities still occur in both regions of the components 5 and 12.

As can further be seen in FIG. 4, the two components 5 and 12 form teeth 13 and 19, respectively, with their segments 14 and 15 or 16 and 17, respectively, in order to thereby accommodate coils 4 of the winding 3, which are not shown in any detail.

Figure 5:
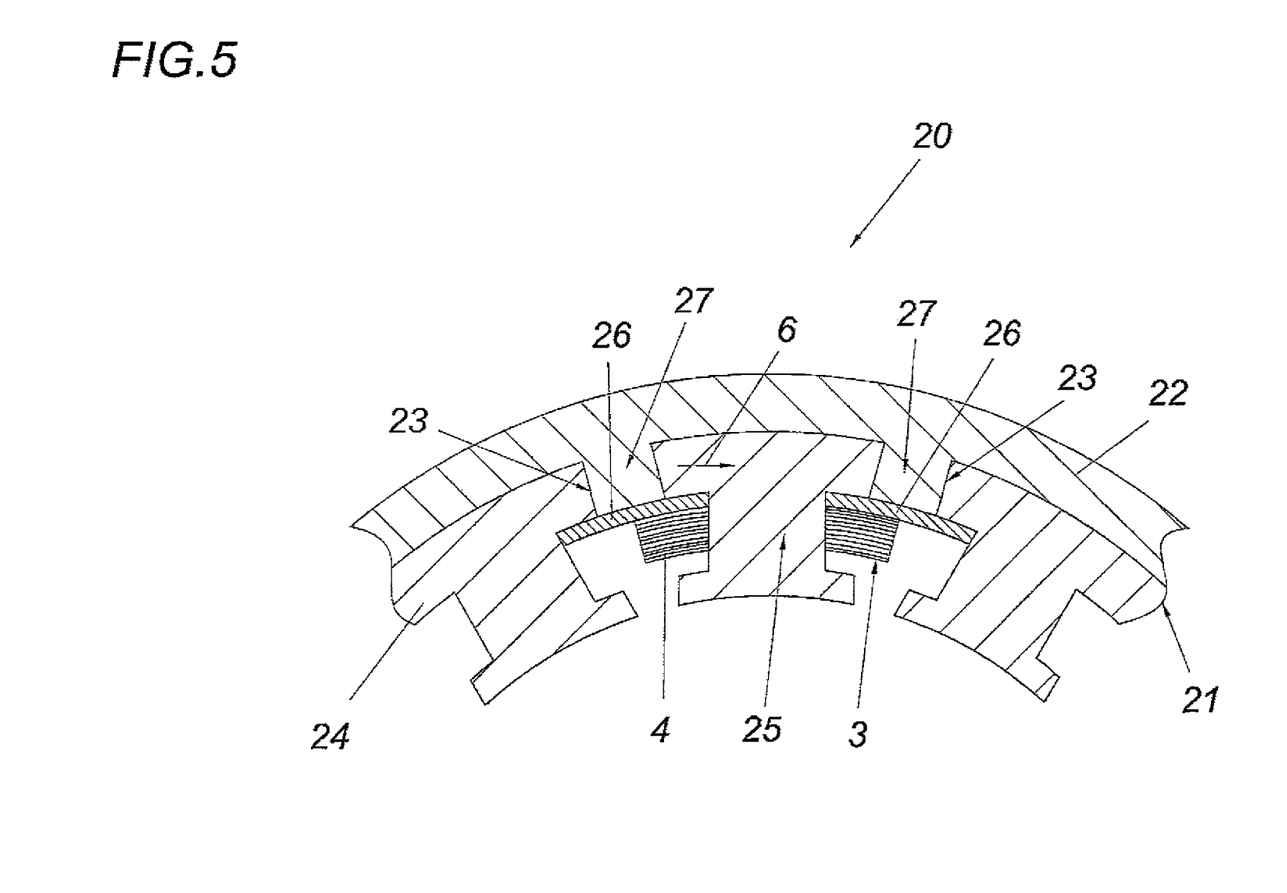
FIG. 5 is a view, shown partly in section, of the arrangement according to the invention, according to a second exemplary embodiment.

According to FIG. 5, an arrangement 20 as a second exemplary embodiment of an electrical machine is shown as an example. This electrical machine, structured as a radial flow machine, shows a stator 21 having a connector part 22, which projects through a penetrating recess 23 of a component 24 that conducts the magnetic flow 6. In this way, the coil 4 that is wound around the tooth 25 of the component 24 is cooled. In order to ensure broad-area cooling of the coil 4, a heat flow collector 26 is provided as a part of the connector part 22, as well this collector stands against the coil 4 and the crosspiece 27 of the connector part, in order to thereby create a particularly efficient thermal bridge.

Although only a few embodiments of the present invention have been shown and described, it is to be understood that many changes and modifications may be made thereunto without departing from the spirit and scope of the invention.

What is claimed is:

1. An arrangement comprising:
   (a) at least one electrical winding,
   (b) a one-part or multi-part first component produced from a soft-magnetic powder composite material, wherein said first component comprises conduction regions having an isotropic structure on the first component and a recess provided near said conduction regions, and wherein said first component conducts an electromagnetic flow of the winding in said conduction regions, and
   (c) a one-part or multi-part connector part projecting through the recess and having at least one of a greater mechanical strength, a greater electrical conductivity, and a greater thermal conductivity as compared to the first component;
   wherein the recess extends completely through the first component in the conduction regions;
   wherein the connector part forms at least one of a mechanical bridge, an electrical bridge and a thermal bridge bridging the first component.

2. The arrangement according to claim 1, wherein the connector part is a mechanical connector part.

3. The arrangement according to claim 1, wherein the connector part that projects through the recess borders at least in part on the winding.

4. The arrangement according to claim 3, wherein the connector part has a crosspiece that projects through the recess of the first component.

5. The arrangement according to claim 3, wherein the connector part has a plate-shaped heat flow collector that stands against the winding.

6. The arrangement according to claim 5, wherein the plate-shaped heat collector stands in a thermal connection with the crosspiece of the connector part.

7. The arrangement according to claim 1, wherein the first component supports the winding, at least in part, at least in some areas.

8. The arrangement according to claim 1, wherein the conduction regions of the first component are restricted in terms of magnetic conduction by the recess and have dimensions that are modified as compared with a second component having no recess so that essentially identical flow densities occur in the conduction regions of the first component and in conduction regions of the second component.

9. The arrangement according to claim 1, wherein the first component and the connector part are connected with material fit.

10. The arrangement according to claim 9, wherein the first component and the connector part are connected using a cast material.

11. The arrangement according to claim 1, wherein the connector part comprises a solid material.

12. The arrangement according to claim 1, wherein the connector part comprises aluminum.

13. An electrical machine comprising:
   (a) a stator; and
   (b) an arrangement comprising at least one electrical winding, a one-part or multi-part first component produced from a soft-magnetic powder composite material, wherein said first component comprises conduction regions having an isotropic structure on the first component and a recess provided near said conduction regions, and wherein said first component conducts an electromagnetic flow of the winding in said conduction regions, and a one-part or multi-part connector part projecting through the recess and having at least one of a greater mechanical strength, a greater electrical conductivity, and a greater thermal conductivity as compared to the first component;
   wherein the recess extends completely through the first component in the conduction regions;

wherein the connector part forms at least one of a mechanical bridge, an electrical bridge and a thermal bridge bridging the first component; and wherein the first component, the winding, and the connector part form parts of the stator of the electrical machine.

14. The electrical machine according to claim 13, wherein the connector part forms not only a thermal bridge but also a mechanical bridge that centers the first component with regard to stator parts of the stator.

15. The electrical machine according to claim 14, wherein the connector part attaches the first component relative to the connector part.

16. The electrical machine according to claim 15, wherein the connector part attaches the first component radially to the connector part.

17. The electrical machine according to claim 13, wherein the connector part is yoke-shaped and the first component is a multi-part component and is inserted into the connector part, and wherein the first component forms at least one tooth for carrying coils of the winding.

* * * * *